United States Patent [19]

Cominassi et al.

[11] 4,070,311

[45] Jan. 24, 1978

[54] FLAMEPROOF MATERIAL OR CONGLOMERATE

[76] Inventors: Adolphe Cominassi, 95 Avenue Mozart, 75-Paris XVI; Henri Lievremont, 69 rue Roger Salengro, 27-Louviers, both of France

[21] Appl. No.: 731,627

[22] Filed: Oct. 12, 1976

Related U.S. Application Data

[63] Continuation-in-part of Ser. No. 695,777, June 14, 1976, abandoned, which is a continuation of Ser. No. 518,716, Oct. 29, 1974, abandoned.

[51] Int. Cl.$^2$ .................................................. C08J 9/14
[52] U.S. Cl. .............................. 260/2.5 F; 260/14; 260/38; 260/841
[58] Field of Search ...................................... 260/2.5 F

[56] References Cited

U.S. PATENT DOCUMENTS

| | | | |
|---|---|---|---|
| 3,298,973 | 1/1967 | Quarles et al. | 260/2.5 F |
| 3,389,094 | 6/1968 | D'Alesandro | 260/2.5 F |
| 3,748,290 | 7/1973 | Reingen et al. | 260/2.5 F |

*Primary Examiner*—Morton Foelak
*Attorney, Agent, or Firm*—Thomas M. Meshbesher

[57] ABSTRACT

An expanded material or conglomerate exhibiting outstanding fire-retardant properties and having an elevated specific weight contains 20 to 80% by weight of a binder constituted by a phenol-formaldehyde resin, 20 to 80% by weight of a gypsum obtained as a by-product in the preparation of phosphoric acid, and possibly inert filler materials which may be constituted by inorganic or organic substances.

14 Claims, No Drawings

FLAMEPROOF MATERIAL OR CONGLOMERATE

CROSS REFERENCE TO RELATED APPLICATIONS

This application is a continuation-in-part of our co-pending continuation application, Ser. No. 695,777, filed June 14, 1976, and entitled "Flameproof Material or Conglomerate", now abandoned which in turn is a continuation of U.S. Ser. No. 518,716, filed Oct. 29, 1974, and now abandoned.

The present invention is related to a flameproof material or conglomerate. Flameproof materials or conglomerates are already known which contain a binder constituted by an expanded polymer which is obtained on the basis of pheno-formaldehyde resin and contains filling materials which are preferably constituted by inorganic substances. These filler materials, or fillers, are constituted more particularly by inert substances such as talcum, magnesium silicate, titanium oxide, mica, lead etc., and consequently they have no chemical influence on the resin and and on the process of polymerization and the process of expansion of said resin. It is known, indeed, that the polymerization and expansion processes are particularly difficult to control and that the presence of non-inert substances in the filler causes phenomena of inhibition or catalysis which make it difficult to control the polymerization and the expansion and to obtain materials of a consistent, reproducible quality.

It has been considered desirable to use by-products obtained in the chemical industry as replacements for the inert fillers used up to now. This would indeed lead to favorable results from the industrial and economical point of view by allowing the re-utilization of certain materials which could not be re-utilized up to now unless they had been previously submitted to expensive and time-consuming treatments, and which consequently have generally been discarded up to now and thus have constituted in many cases a factor of pollution of the natural environment. It is obvious that the re-utilization of such by-products without costly special treatments would also bring about considerable economical advantages, as the operations and investments involved when transporting these by-products and stocking the same, e.g. in quarries or the like, result in considerable expense.

However, these by-products of the chemical industry present a major drawback in that they contain impurities resulting from the reactions by which they are obtained, these impurities constituting an obstacle to the achievement of consistent polymerization and expansion reactions, as already indicated hereinabove. Said impurities furthermore are not only undesirable per se, but the amounts of impurities present in the by-products may vary within large limits, depending on the reactions by which the by-products have been obtained and on the nature of the raw materials which were used in such reactions.

The present invention is based on the surprising discovery that it is possible to incorporate certain by-products of the chemical industry containing impurities which may have an influence on the polymerization and possibly on the expansion, in a phenol-formaldehyde resin and to submit this mixture to polymerization and expansion without impeding the consistency of the conditions of such reactions and the results obtained.

This discovery has shown that it is possible to use such by-products which a view to preparing flameproof or fire-retarding expanded materials or conglomerates containing phenol-formaldehyde resin. Furthermore, the thus prepared materials may contain a comparatively high amount of such by-products and consequently their specific weight may attain values higher than 200kg/m$^3$ and even 300 kg/m$^3$.

The expanded material or conglomerate according to the instant invention contain 20 to 80% by weight of a binder constituted by a phenol-formaldehyde resin, and 20 to 80% by weight of phospho-gypsum.

It is well known that the substance called "phospho-gypsum" is the calcium suphate constituting a by-product of the reaction used for the preparation of phosphoric acid in accordance with the following equation:

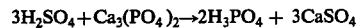

$$3H_2SO_4 + Ca_3(PO_4)_2 \rightarrow 2H_3PO_4 + 3CaSO_4$$

Said phospho-gypsum contains, of course impurities and presents, more particularly a certan remanent acidity due to the process by which it is obtained. As is known in the art, the impurities contained in the above-described phospho-gypsum (also called "by-product gypsum" or "synthetic gypsum" or "chemical gypsum") correspond roughly to the impurities contained in the phosphate rock which provides the calcium phosphate reactant (i.e. the $Ca_3(PO_4)_2$ reactant) in the aforementioned equation, plus additional impurities attributable to the presence of unreacted or free acid (i.e. sulfuric acid) and unreacted or precipitated phosphate. See *Chemical and Process Technology Encyclopedia*, D.M. Considine, Editor, McGraw-Hill 1974, p. 567 (hereinafter referred to as "Technology Encyclopedia"); and Kirk-Othmer *Encyclopedia of Chemical Technology*, 2nd Edition, Volume 4, John Wiley & Sons, 1964, pages 17 and 18 (hereinafter referred to as Kirk-Othmer). As noted in both of these references, commercial use of phospho-gypsum has been impeded because of these impurities, although some phospho-gypsum has been used in agriculture and in places where good mineral gypsum is scarce (e.g. in Japan). According to Kirk-Othmer typical practices for upgrading phospho-gypsum or by-pruduct gypsum "must" include neutralization of free acid in the material and removal of soluble efflorescent salts. Furthermore, the Technology Encyclopedia points out that phospho-gypsum can contain more than 0.5% of residual chloride, fluoride, and phosphate, and upgrading of phospho-gypsum requires adequate control of these impurities.

In volume 9 of Kirk-Othmer (1967), representative analyses of commercial phosphate rocks are set forth on page 82, and phosphate rock reserves are discussed in detail on pages 83–86. Chlorine content of U.S., Central American, North African, Pacific Island and Russian rock is rather small (0.001 to 0.2% by weight), but fluorine content, except for the Nuevo Leon deposits in Mexico, ranges from 1.8% (low grade Western U.S. phosphoria rock) to 4.2% (French Morocco phosphate rock). In the case of extremely important high grade "land pebble phosphate" mined in Florida, fluorine content ranges from 2.1 to 4%. Apatite, $Ca_{10}(PO_4)_6(F,Cl,OH)_2$ is the principal mineral in the important phosphate rock deposits of the world, and the apatite "most often found" (according to Kirk-Othmer) is fluorapatite, $(CA_{10}F_2(PO_4)_6$ which occurs "mainly in conjunction with calcium carbonate in a mineral called francolite, $Ca_{10}F_2(PO_4)_6 \cdot xCaCO_3$". Thus, the phospho-gypsum most commonly produced generally contains more than 0.5% by weight of F and typically contains more than 1% F, even assuming that considerable fluorine content (e.g. up to 75% by weight) is left behind in the supernatant produced in the so-called "wet process" for making phosphoric acid (the "wet process" is described in Kirk-Othmer, Volume 9, page 86). Of course, fluorapatite itself in very difficult to dissolve in aqueous media (Kirk-Othmer, Volume 9, page 86), and it is particularly likely that both the phosphate and the fluorine content of phospho-gypsum derived from this mineral will exceed 0.5% by weight, unless deliberate attempts at upgrading are made.

Neutralization of phospho-gypsum or bringing phospho-gypsum up to the pH of natural gypsum (which is about 6 according to Lange's *Handbook of Chemistry*, 9th Ed., page 171) if carried out as suggested by the prior art, would normally involve raising the pH by more than a unit, e.g. about 3 pH units.

Although phosphate, sulfuric acid, and fluoride residues have traditionally characterized phospho-gypsum, other major impurities can occur. In the phosphate starting material, other major impurities include ferric oxide, aluminum oxide, magnesium oxide, organic carbon, silica, sulfur trioxide, and alkali metal compounds. Of these, aluminum oxide and ferric oxide (or ferric sulfate, if the oxide is converted to the salt by sulfuric acid) are likely to remain unreacted or may otherwise co-precipitate in some form with the phospho-gypsum. Silica can also co-precipitate to the extent that it is not solubilized by hydrofluoric acid formed in situ by the fluoro-phosphate/sulfuric acid reaction. Solubilized impurities will, like the unreacted sulfuric acid, also be present in the phospho-gypsum due to the virtually inescapable contamination of any precipitate with the supernatant liquor. Alumina content of phosphate rock is typically in excess of about 0.1% and can be as high as 14.8% (as in Florida waste pond hard rock phosphate). Thus, alumina content of phospho-gypsum in excess of 0.5% may occur. Ferric oxide impurities in phosphate rock are less concentrated, the typical range in phosphate rock being 0.1-6.2%. When North African or high grade Florida land pebble is used in the so-called "wet process" for phosphate making phosphoric acid, iron contamination of the resulting phospho-gypsum may be rather minimal. High silica content in phospho-gypsum is more difficult to avoid, however. Most Eastern U.S. phosphate rock (including the highly important FLorida and Tennessee deposits) contains more than 4% silica, e.g. 4.3-25.6%. North African phosphate can contain 0.8-7.8% silica. These high levels of silica may not show up in the phospho-gypsum if the phosphate is beneficiated prior to use in making "wet process" phosphoric acid, however.

In the United States, the phospho-gypsum produced by W. R. Grace & Co. (see Example 7 herein) comes from Florida and may contain at least 1 or 2% F content, even assuming a major amount of retention of fluoride by the phosphoric acid produced in the "wet process".

In one embodiment of the instant invention said expanded material or conglomerate further contains 30 to 120% by weight, based on the weight of the resin binder, of an inorganic or organic inert filler.

Preferably the inorganic filler is constituted by talcum, however it may contain one or more substances selected from the group consisting of mica, asbestos, calcium carbonate, silica, titanium oxide, slate, in a powderous state, finely divided lead, wood powder, cork powder, glass fibres, synthetic fibres on the base of polyamides, synthetic resin, etc.

In another embodiment of the invention said expanded material or conglomerate contains 20 to 65% by weight binder, 30–75% by weight phospho-gypsum and 0 to 40% by weight, preferably 15–25% by weight, inorgaic filler materials.

In still another embodiment of the invention said expanded material contains 25 to 65% by weight binder, 35 to 75% by weight phospho-gypsum and 0 to 35% by weight, preferably 0 to 25% by weight, inorganic filler materials. In yet another embodiment of the invention, the expanded material or conglomerate has a specific weight higher than 200 kg/m$^3$, and preferably higher than 300 kg/m$^3$.

In accordance with a particular embodiment of the invention said expanded material or conglomerate may be associated with at least one layer constituted by a fibrous material, such as a glass fibre mat, or a similar fibrous mat.

Advantageously, the viscosity of the resin used for preparing the instant expanded material or conglomerate is lower than 100 poises and is preferably comprised between 40 and 80 poises, when in the liquid state.

Other objects and advantages of the instant invention will become apparent from the following description.

The instant invention is carried out by means of a known installation comprising first means for feeding under pressure phenol-formaldehyde resin and powderous materials or fillers including at least one expansion agent to a first mixing zone wherein said resin and said powderous materials are mixed, metering means for metering predetermined amounts of the first mixture thus obtained, and for metering predetermined amounts of a polymerization catalyst, which amounts of catalyst are determined as a function of the nature and the amounts of said first mixture, and second means for feeding under pressure said amounts of said first mixture and of said catalyst to a second mixing zone associated to extruding means.

Said installation further comprises means for controlling the respective flow rates of the resin and the powderous materials, and means for adjusting the respective flow rates of said first mixture and said catalyst fed into said second mixing zone, which latter flow rates are preferably maintained at constant values.

Said first and second mixing zone, and possibly the various feeding conduits of the installation, comprise means for measuring the temperature and means for cooling/or heating the material being treated. Preferably, said means for measuring the temperature act to control the respective flow rates of the cooling and/or heating media used, through the intermediary of convenient automatic control means.

The installation described hereinabove operates as described herinafter:

A phenol-formaldehyde resin is introduced by the first feeding means under pressure into the first mixing zone, while the powderous material comprising a mixture of phospho-gypsum, expansion agent and/or inert materials are also introduced into said first mixing zone. The powderous materials are introduced into said mixing zone in a dry state and their respective amounts are accurately determined.

The first mixture thus obtained in the first mixing zone is fed into the second mixing zone, while a catalyst is simultaneously fed into the latter. Polymerization and simultaneous expansion are initiated in said second mixing zone, and the second mixture obtained therein is than extruded.

The examples hereinbelow are not to be construed as being of a limiting nature. The amounts or proportions indicated in these examples are given by weight, unless otherwise specified.

The various tests used for determining the physical properties of the materials obtained are indicated hereinafter:

Determination of the fire-retardant (or flameproof) properties:

testing method defined in the Departmental Orders of the Minister for Home Affairs of the French Republic dated Dec. 9, 1957 and July 10, 1956;

Determination of the compression strength:

test method defined by French standard specification NF T 56 101 in a room with an ambient temperature of 21° C ± 0,5.

EXAMPLES 1 TO 4

In accordance with the method described hereinabove square plates of 500 mm × 500 mm containing 60% pheno-formaldehyde resin and 40% phospho-gypsum are produced.

Some of these plates are reinforced by glass fibre mats arranged on both surfaces of each plate.

The samples are referenced as indicated hereinbelow:

1. This sample is reinforced by a glass fibre mat.
   Due to the addition of pigments a brick-red coloration is obtained. The specific weight of the sample is 397 kg/m$^3$.
2. This sample is not reinforced.
   Due to the addition of pigments an orange-red coloration is obtained. The specific weight of the sample is 425 kg/m$^3$.
3. This sample is not reinforced.
   Due to the addition of pigments an orange-red coloration is obtained. The sample has a specific weight of 362 kg/m$^3$.
4. This sample is reinforced by a glass fibre mat.
   Due to the addition of pigments a brick-red coloration is obtained. The specific weight of the sample is 361 kg/m$^3$.

Samples 1 to 3 have a thickness of 35 to 39 mm, while sample 4 has a thicknes of 55 mm.

The specific weight indicated hereinabove is an average value which has not undergone any correction taking into account the presence of glass fibres.

Table I indicates the results of the compression strength tests carried out in accordance with the French standard specification NF T 56 101, under the above-indicated conditions. The indicated value, expressed in da N/cm$^2$ is the critical pressure measured at the first flattening portion of the recorded curve.

TABLE I

| Example Specific weight | 1 (397 kg/m$^3$) | 2 (425 kg/m$^3$) | 3 (362 kg/m$^3$) | 4 (361 kg/m$^3$) |
|---|---|---|---|---|
| | 19,0 | 23,0 | 20,8 | 18,2 |
| | 19,2 | 25,0 | 21,2 | 22,9 |
| | 20,0 | 23,0 | 16,2 | 21,3 |
| | 18,4 | 23,8 | 23,2 | 20,5 |
| | 17,6 | 27,4 | 29,8 | 25,7 |
| | 18,8* | 24,4* | 22,2* | 21,7* |

*Average values of the tests results.

Table II indicates the results of the tests for determining the fire-retardant properties, carried out in accordance with the above-mentioned Departmental Orders.

TABLE II

| Example | 1 | 2 | 3 | 4 |
|---|---|---|---|---|
| Inflammability index | 0 | 0 | 0 | 0 |
| Combustion development index | 0 | 0 | 0 | 0 |
| Maximum flame height index | 0 | 0 | 0 | 0 |
| Combustibility index | 0 | 0 | 0 | 0 |

EXAMPLE 5

A sample containing 30% phenol-formaldehyde resin, 50% phospho-gypsum and 20% inorganic filler material constituted by talcum is prepared in accordance with the method set forth in Example 3, but without addition of pigments.

The material of the resulting sample has a specific weight of 335 kg/m$^3$ and the results of the tests for determining the fire-retardant properties correspond to an inflammability index equal to zero, a combustion development index equal to zero, a maximum flame height index equal to zero and a combustibility index equal to zero.

EXAMPLE 6

A sample containing 25% of phenol-formaldehyde resin and 75% of phospho-gypsum is prepared in accordance with the method set forth in Example 3, but without addition of pigments.

The material of this sample has a specific weight of about 420 kg/m$^3$, and the results for determining the fire-retardant properties correspond to an inflammability index equal to zero, a combustion development index equal to zero, a maximum flame height index equal to zero, and a combustibility index equal to zero.

EXAMPLE 7

The purpose of this Example is to explore the effect of adding various levels of phosphogypsum to a phenolic resin composition which is foamed with the aid of a volatile or fugitive expansion or foaming agent, in this case a low boiling "petroleum ether".

The phosphogypsum used in this Example was obtained from W. R. Grace & Company and had a pH, when slurried in water, of less than 3. (The pH of natural gypsum, according to Lange's *Handbook of Chemistry*, 9th Edition, Handbook Publishers, Inc., Sandusky, Ohio, 1956, page 171 is 6.) This phosphogypsum was not upgraded in any way. Accordingly, the phosphogypsum contained residual acid from the phosphoric acid manufacturing process and also contained the impurities of the calcium phosphate rock from which it was derived.

The other raw materials used in this Example were as follows:

Phenolic resin system: "PLYOPHEN DR-391" (trade designation of Reichhold Chemicals, Inc. of Detroit, Mich.), a composition with a viscosity at 25° C. of 3,000–5,000 centipoise, a non-volatiles content of 78–82%, and a specific gravity at 25° C. of 1.230–1.250. The resin system contains a small concentration of surfactant to provide a relatively fine, uniform foam structure. According to the manufacturer, this resin is permanently resistant to temperatures of up to 266° F. and, for a short time, for temperatures up to 392° F. The resin is supposed to be subject to carbonization at temperatures above 392° F.

The hardener (catalyst): Equal parts by weight of ethylene glycol and 37% HCl.

Foaming agent: A 1:1 by weight mixture of low boiling (30°–50° C.) petroleum ether (which consists essentially of alkanes) and hexane. According to manufacturer's recommendations, a well-controlled foamed product can be obtained from the resin, hardener, and foaming agent in the density range of about 1 pound per cubic foot (80 Kg/m$^3$) to about 6 pounds per cubic foot (500 Kg/m$^3$).

The reactor in which the phosphogypsum/resin mixtures were foamed and hardened was a "Styrofoam" (foamed polystyrene) box lined with "Saran Wrap" (polyvinylidene chloride film). This reactor structure was selected to provide an insulated reaction zone, where the exotherm from the reaction would not be carried away rapidly.

Three formulations were selected to provide densities ranging from about 40 Kg/m$^3$ to more than 500 Kg/m$^3$. These three formulations are designated Example 7(A), 7(B), and 7(C), and are set forth below.

EXAMPLE 7(A)

| Ingredients | Grams | ml. |
|---|---|---|
| Phenolic resin ("PLYOPHEN DR-391") | 227 | — |
| Phosphogypsum | 100 | — |
| Acid hardener (catalyst) | — | 91 |
| Foaming agent | Amount recommended to produce foam of 80 Kg/m$^3$ | |

EXAMPLE 7 (B)

| Ingredients | Grams | ml. |
|---|---|---|
| Phenolic resin ("PLYOPHEN DR-391") | 227 | — |
| Phosphogypsum | 180 | — |
| Acid hardener (catalyst) | — | 91 |
| Foaming agent | | Same as in Example 7 (A) |

EXAMPLE 7 (C)

| Ingredients | Grams | ml. |
|---|---|---|
| Phenolic resin ("PLYOPHEN DR-391") | 227 | — |
| Phosphogypsum | 250 | — |
| Acid hardener (catalyst) | — | 91 |
| Foaming agent | | Same as in Example 7 (A) |

The procedure for foaming all of the above three formulations was as follows. The phosphogypsum, the resin, and 48 ml. of hardener were emulsified with a high speed mixture over a period of one minute. To the emulsified mixture was added 43 ml. of hardener, and agitation was continued for another minute. The mixture was then poured into the reactor and was retained there until foaming had subsided and the foam had cured.

With all three formulations, the foamed sample had a dense crust-like surface with a relatively high density. The density of the internal mass of the foam was relatively uniform, however, and was found to be only ⅓ to ½ that of the outer crust. All density determinations were made on the inner, relatively uniform regions of the foam.

In the case of Example 7(C), the density was difficult to measure and was estimated, using the whole block of material instead of a selected core sample. The foaming action for Example 7(C) was modest, and appeared to represent only about a 50% increase in volume of the reactants. However, no significant difficulties were observed in foaming this formulation or either of the other two formulations.

The results of the density determinations are given below.

| Example | Percent by Weight of Phosphogypsum | Density, Kg/m$^3$ |
|---|---|---|
| 7 (A) | 30 | 40 |
| 7 (B) | 44 | 140 |
| 7 (C) | 52 | >500 |

The material from Example 7(B) (44% phosphogypsum) was selected for studies of the thermal properties.

One study involved the insulation properties of the material. A small Bunsen flame was applied to one surface of a 25 mm. thick block of foam and the temperature differential was followed over a period of time. The results were as follows:

| Time (Minutes) | Temperature, ° C. Heated Side | Temperature, ° C. Unheated Side |
|---|---|---|
| 0 | 28 | 28 |
| 1 | 50 | 28 |
| 2 | 70 | 28 |
| 3 | — | — |
| 4 | 100 | 28 |
| 5 | 120 | 28 |
| 6 | 150 | 28 |
| 7 | 180 | 29 |
| 8 | 200 | 29 |
| 9 | 220 | 29 |
| 10 | 240 | 30 |
| 11 | 280 | 31 |
| 12 | 300 | 33 |
| 13 | 300 | 35 |
| 14 | 340 | 37 |
| 15 | 350 | 39 |
| 30 | 350 (660° F) | 48 |

A second, more severe thermal test was conducted by directly applying the flame of an oxy-acetylene torch to the aforementioned 25 mm. block of foam (Example 7(B) and to a sample made according to Example 7(C). Neither sample was found to be flammable or capable of supporting combustion.

What is claimed is:

1. An expanded material or conglomerate comprising: 20–80% by weight of a binder comprising a phenol-formaldehyde resin, and 20–80% by weight of the sulfuric acid residue-containing, synthetically produced calcium sulfate known as phospho-gypsum, said phospho-gypsum being the reaction product of the components comprising sulfuric acid and fluorine-containing calcium phosphate rock, said fluorine-containing calcium phosphate rock containing, by weight, 1.8–4.2% F and at least 0.1% of Al$_2$O$_3$ or Fe$_2$O$_3$, and said phospho-gypsum having a pH less than natural gypsum and containing more than 0.5% by weight of F and phosphate residues from said phosphate rock.

2. An expanded material or conglomerate according to claim 1, further containing 30 to 120% particulate of fibrous inorganic filler material, based upon the weight of said binder.

3. An expanded material or conglomerate according to claim 2 wherein said particulate inorganic or organic filler material includes at least one substance selected from the group consisting of mica, asbestos, calcium carbonate, silica, titanium oxide, slate, lead, wood powder, cork powder, glass fibres, synthetic polyamide fibres, synthetic resin, and magnesium silicate.

4. An expanded material or conglomerate according to claim 3 wherein said particulate inorganic filler material comprises magnesium silicate.

5. An expanded material or conglomerate according to claim 4 wherein said magnesium silicate is talcum.

6. An expanded material or conglomerate according to claim 1 containing 20 to 65% by weight binder, 30 to 75% by weight said calcium sulfate, and 0 to 40% by weight inorganic mineral filler material.

7. An expanded material or conglomerate according to claim 6 containing 15 to 25% by weight of said inorganic mineral filler material.

8. An expanded material or conglomerate according to claim 1 wherein said binder comprising a phenol-formaldehyde resin has a viscosity lower than 100 poises, when said resin is in the liquid state.

9. An expanded material or conglomerate according to claim 8 wherein said viscosity is within the range of 40 to 80 poises.

10. An expanded material or conglomerate according to claim 1 which has a specific weight greater than 200kg/m$^3$.

11. An expanded material or conglomerate according to claim 10 wherein said specific weight is greater than 300kg/m$^3$.

12. An expanded material or conglomerate according to claim 1 which is associated with at least one mat or layer comprising a fibrous material.

13. An expanded material or conglomerate according to claim 12 comprising a layer of said expanded material or conglomerate reinforced with a glass fiber mat arranged on a surface thereof.

14. In a method for manufacturing an expanded material or conglomerate comprising the steps of:
 a. feeding under pressure to a first mixing zone a phenol-formaldehyde resin and at least one expansion agent to obtain a first mixture, comprising 20 to 80% by weight phenol-formaldehyde resin,
 b. feeding said first mixture to a second mixing zone while simultaneously feeding a catalyst to said second mixing zone, whereby simultaneous polymerization and expansion are initiated in said second mixing zone,
the improvement which comprises the steps of:
 obtaining the acid residue-containing synthetically produced calcium sulfate known as phospho-gypsum, in powder form, and
 including 20–80% by weight of said phospho-gypsum in said first mixture as a fire-retarding additive; said phospho-gypsum having a pH less than about 3 and containing more than 0.5 weight-% F and more than 0.5 weight-% residual phosphate.

* * * * *

UNITED STATES PATENT AND TRADEMARK OFFICE
CERTIFICATE OF CORRECTION

PATENT NO. : 4,070,311

DATED : January 24, 1978

INVENTOR(S) : Adolphe Cominassi and Henri Lievremont

It is certified that error appears in the above-identified patent and that said Letters Patent are hereby corrected as shown below:

In column 1, line 16, for "pheno-formaldehyde" read
--phenol-formaldehyde--.
In column 1, line 18, for "fller" read --filler--.
In column 2, line 18, for "course impurities" read
--course, impurities--.
In column 2, line 58, for "of extremely" read --of the
extremely--.
In column 2, line 61, for "E" read --F--.
In column 4, line 7, for "inorgaic" read --inorganic--.
In column 4, line 50, for "cooling/or" read --cooling
and/or--.
In column 5, line 23, for "pheno-formaldehyde" read
--phenol-formaldehyde--.
In column 8, line 62, for "inorganic filler" read
--inorganic or organic filler--.

Signed and Sealed this

Twelfth Day of September 1978

[SEAL]

Attest:

RUTH C. MASON
*Attesting Officer*

DONALD W. BANNER
*Commissioner of Patents and Trademarks*